United States Patent [19]
Tremblay

[11] Patent Number: 5,875,483
[45] Date of Patent: Feb. 23, 1999

[54] COMPLETION UNIT REGISTER FILE USING VIRTUAL ADDRESSES WITH QUALIFY AND PSEUDO-ADDRESS BITS

[75] Inventor: Marc Tremblay, Palo Alto, Calif.

[73] Assignee: Sun Microsystems, Inc., Palo Alto, Calif.

[21] Appl. No.: 880,253

[22] Filed: Jun. 23, 1997

Related U.S. Application Data

[63] Continuation of Ser. No. 363,378, Dec. 23, 1994, abandoned.

[51] Int. Cl.$^6$ ............................................. G06F 12/00
[52] U.S. Cl. ............................................. 711/210; 711/203
[58] Field of Search ........................... 364/231.8, 948.34; 711/1, 203, 209, 210

[56] References Cited

U.S. PATENT DOCUMENTS 5,237,671  8/1993  Freitas et al. ............................ 711/207

*Primary Examiner*—Jack A. Lane
*Assistant Examiner*—Kevin Verbrugge
*Attorney, Agent, or Firm*—Limbach & Limbach L.L.P.

[57] ABSTRACT

A method and apparatus for generating a qualify bit and detecting matching addresses in the completion unit register file, or annex, of a processor. A qualify bit is appended to each entry in the annex. Overlapping register windows are represented by a window pointer and a register index. Annex entries addressed to the same window or addressed to GLOBAL registers always qualify. Annex entries addressed to OUT registers only qualify if the instruction address is one of the IN registers of the next window. Annex entries addressed to IN registers only qualify if the instruction address is one of the OUT registers of the previous window. A pseudo-address bit is appended to each annex entry. For IN and OUT registers, the indexes for the aliases differ by one bit. The pseudo-address bit normally takes on the value of the most significant bit of the annex entry's index. If the instruction operand virtual register is an OUT register of a certain window, and the annex virtual register is an IN register within the next window, the pseudo-address bit for that entry is set to one. If the instruction operand virtual register is an OUT register within the previous window, the pseudo-address bit for that entry is set to zero. Comparison logic then compares the instruction operand index to the annex index with the differing bit of the annex index replaced by the pseudo-address bit. Entries that match and that have asserted qualify bits address the same physical register.

19 Claims, 12 Drawing Sheets

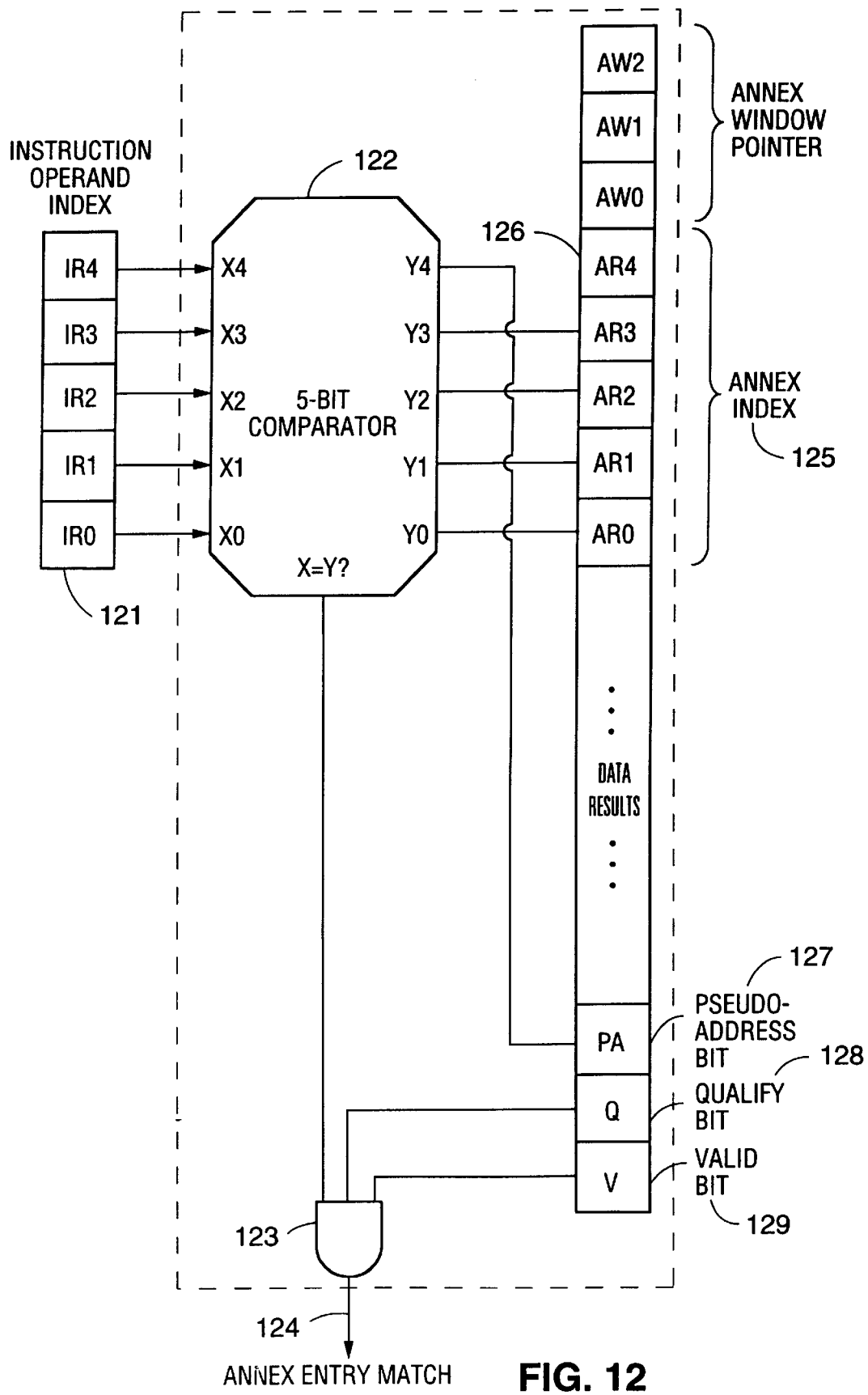

COMPLETION UNIT REGISTER FILE USING VIRTUAL ADDRESSES WITH QUALIFY AND PSEUDO-ADDRESS BITS

This is a continuation of co-pending application Ser. No. 08/363,378 filed on Dec. 23, 1994, now abandoned.

BACKGROUND OF THE INVENTION

1. Field of the Invention

The present invention relates to pipelined superscalar processors. Specifically, the present invention deals with retrieving results from a completion unit register file prior to writing them into their destination registers.

2. Discussion of the Prior Art

A typical early microprocessor included a central processing unit (CPU) which implemented a machine capable of interfacing with memory and serially executing a sequence of instructions. The instruction execution was typically broken into at least four major stages: instruction and operand fetch, instruction decode, execution, and write back of results into the destination registers. A typical instruction took one clock cycle to execute, so that each of the four functions was performed in that cycle. Each stage had to wait for the results from the previous stage before its work could be accomplished. The minimum clock period was then determined by the longest possible propagation delay through all four stages.

The concept of pipelining increased the maximum clock frequency by reducing the amount of logic performed in each clock cycle. To facilitate this, for example, the interface between the second and third stages could be separated by clocked latches. The first two stages (fetch and decode) would be performed in one clock cycle. Subsequently, during a second clock cycle, the last two stages (execution and write back) would be performed. Here, the overall latency of an instruction might remain approximately the same since the total amount of time from the beginning of the fetch to the end of the write back would be approximately the same. However, separating the instruction execution into two distinct pieces has the important advantage that the throughput could be increased by as much as a factor of two. This is a result of the fact that the pipelined CPU can operate on two instructions simultaneously. While the execution and write back of one instruction is being performed, the fetch and decoding of a second instruction can be performed. Quite naturally, this pipelining concept can be extended such that each of the four stages is performed in a separate clock cycle, thus increasing the throughput accordingly. Thus, by dividing the logic into N separate segments, the throughput can theoretically be increased by a factor of N.

Superpipelined designs break up the logic in some or all of the four stages so as to reduce the maximum propagation delay through any one stage, and thus increase the operating frequency and throughput as the instruction execution is broken into more than four pipeline stages. A superscalar microprocessor 10 is shown in FIG. 1.

A superscalar processor 10 has several parallel functional units 11. Some typical superscalar implementations include floating point, integer, branch, and load/store functional units 11. Typically, among the functional units 11 are units which can perform floating point calculations or similar complex operations. It is desirable to run these complex units at the same clock frequency as the rest of the hardware, while still allowing for each functional unit 11 to begin executing a new instruction every cycle. To accomplish these objectives, pipelining of the parallel functional units 11 is desirable. The complexity and logical partitioning of the most complicated functional unit dictates the number of pipeline stages necessary in that functional unit 11. Not all of the functional units 11 have the same latency. Of these four parallel functional units 11, the floating point unit will probably turn out to have the most complexity. Because the other three types of functional units 11 are not as complex, it is possible to pipeline these other functional units into fewer stages than are required for the pipelining of the floating point unit. All of the parallel functional units 11 merge back into the final stage 12 in which the results of the executions are written into their respective destination registers.

If the pipeline for every parallel functional unit 11 is not the same number of stages, then the results from some functional units 11 will be available sooner than others. For example, if the pipelining of the floating point unit requires five stages, while the pipelining for the integer unit only takes two stages, then the results from the integer unit would be available three clock cycles prior to the results of the floating point unit even though both instructions were dispatched concurrently. By the same token, "younger" instructions can finish sooner than older instructions. For example, during one clock cycle a floating point instruction is dispatched, and during the next subsequent clock cycle, an integer instruction such as an addition is dispatched. If the integer pipeline is three stages shorter than the floating point pipeline, the integer addition result will be available two clock cycles before the floating point result even though the floating point instruction was dispatched first. In this example, the integer addition was a "younger" instruction because it was dispatched later than the "older" floating point instruction.

If some younger instructions are allowed to write into the destination registers before some older instructions, potential problems arise. For example, if both instructions write to the same destination register, the programmer expects the younger instruction to write over the results of the older instruction. If in fact the older instruction writes over the results of the younger instruction, the processor has not correctly executed the sequential program since the intended result does not appear in the intended destination. Therefore it is important to maintain the sequential nature of instruction result writeback.

Referring now to FIG. 2, in order to facilitate sequential write-back of instruction results, any shorter functional unit pipeline 20 is lengthened with extra pipeline stages so that all functional units have the same latency from dispatch 21 to write back 22. In the shorter functional unit pipeline 20, this results in several extra stages 23 being added to the end of the functional unit pipeline 20. These additional pipeline stages 23 effectively form a first-in-first-out (FIFO) buffer, known in the industry as a completion unit register file, which will be referred to as an annex.

Although preserving the sequential nature of the program execution and write-back, the addition of the extra stages 23 in the pipeline of the shorter functional unit 20 pipeline creates additional complications. Assume the shorter functional unit 20 in FIG. 2 is an integer ALU functional unit which might be used to execute a sequence of instructions. For example, consider the following program fragment where add rs1,rs2,rd denotes that the contents of register rs1 and the contents of register rs2 should be added and the result should be stored to register rd.

add r1,r2,r3;
add r3,r4,r5;

Here, the first instruction creates a result for register r3. The very next instruction uses the value for r3 that was computed by the previous instruction. Unfortunately, however, the value of r3 which was calculated by the first instruction has not been written into the register file by the time the second instruction begins execution. The destination register in the register file is not finally updated until the write-back stage 22 is reached at the end of the annex 23. Therefore, the correct operand of the second instruction is resident in the first entry of the annex when the second instruction is executing. In order to allow the entries of the annex to be utilized by subsequent instructions, some access to the annex 23 must be provided. In addition, some means must be provided to determine which register addresses are stored in each entry of the annex 23 in order to determine which entry, if any, should be provided back to the inputs of the functional units 20 and 24.

Referring to FIG. 3, an advantageous method involves the use of a memory 30 to implement the annex. If an entry in the annex 30 contains that most up-to-date or "youngest" version of a variable which needs to be used as an operand in a current instruction, that entry can be driven onto the annex access bus 31 and selected by the multiplexor 32 to provide the input to the functional unit 33. Instead of feeding through each entry of the annex 30, only one set of feedthroughs 31 are provided to a two input multiplexor 32. This eliminates increase in pitch of the functional unit datapath 34 regardless of the number of entries in the annex 30. The number of inputs to the multiplexor 32 remains two regardless of the number of entries in the annex 30.

One way to determine which entry, if any, should be provided to the multiplexor 32 involves the use of content addressable memory in the address field of the annex 30. Each entry in the annex 30 stores an address field and a data field. The address field contains the address of the destination register, while the data field holds the results to be stored to that destination register. When attempting to determine if one of the operands is in the annex 30, the address of that operand is simultaneously compared to all of the addresses stored within the annex. If there is a match, the match line for that entry is asserted.

Most instructions require more than one operand. For instance an add x,y,z instruction performs an addition of the contents of x to the contents of y and stores the result in z; thus x and y are operand registers. Because it is possible that data destined for both x and y are in the annex 30, more than one compare port and set of match lines in the content addressable memory should be provided to allow simultaneous look-up for all the operands.

The search for an annex entry which contains results for a particular operand destination register address is somewhat complicated by the fact that some processors support "virtual" register addresses which are different from the "physical" register addresses. In most implementations, the number of real physical addresses is different than the number of virtual addresses. Usually, there are more virtual addresses than physical addresses. When there are more valid virtual addresses than physical addresses, some of the virtual addresses must map to the same physical address. Multiple virtual addresses which map to the same physical address are called "aliases".

An architecture using register windows commonly uses virtual addresses which map to physical addresses. The operand registers and destination register addresses are referred to by their respective virtual addresses within instructions. There are many advantages to the use of register windows. Register windows allow for multiple register use without the time-consuming spills and fills to main memory characteristic of fixed register set designs found in many architectures. Using a large "windowed" register file, the processor has access to a large number of on-chip registers configured in overlapping sets. This access permits compilers to automatically cache values and pass parameters in registers. At any one instant, a program sees eight GLOBAL integer registers plus a 24-register window into a larger register file. The windowed registers can be used as a cache of procedure arguments, local values, and return addresses.

FIG. 4 illustrates the circular stack nature of register windows for an eight window implementation. FIG. 5 illustrates the same window structure from a flat perspective. At any time, a program can address 32 integer registers: 8 INs 50, 8 LOCALs 51, and 8 OUTs 52 of the active window, and the 8 GLOBAL registers 53 that are addressable from any window. The 8 OUTs 52 of one window are also the 8 INs 50 of an adjacent window. The overlapping nature of the register windows makes them ideal for multitasking environments like UNIX, where parameters can be quickly passed between procedures. Because of the overlapping nature of the register windows where specific registers are shared between the windows, there is no actual movement of parameters. Rather, parameters are simply shared between the caller and callee register windows.

The actual number of physical registers in the register file is less than the number of virtual registers in the virtual register files. In part, this is because the eight physical registers designated as GLOBAL registers 53 are shared among all virtual register windows. Moreover, the IN registers 50 of one virtual window and the OUT registers 52 of the adjacent virtual window are, in fact, the same physical register. Thus, for a virtual register file having K windows, each having N GLOBAL, N LOCAL, N IN, and N OUT registers, the total number of virtual registers is 4*K*N, while the total number of real physical registers is only (2K+1)*N.

FIG. 6 shows a typical mapping of the virtual register windows to physical registers 60. Within each window, the registers are virtually addressed in the same way. Registers r[0] through r[7] are the GLOBAL registers g0–g7; registers r[8] through r[15] are the OUT registers o0–o7; registers r[16] through r[23] are the LOCAL registers l0–l7; and registers r[24] through r[31] are the IN registers i0–i7. A current window pointer (CWP) 61 keeps track of the current window.

Because of the unique virtual register file configuration, a virtual to physical register address 62 translation must take place each time a register is accessed. The translation is accomplished by applying the current window pointer (CWP) 61 and the virtual register number to a translator, which performs a calculation to obtain the physical register address 62. This is a moderately complicated calculation. In the mapping shown in FIG. 6, the physical address 62 could be translated by adding the virtual register index to the product of 16 and the current window pointer 61. If the binary representation of the current window pointer 61 is W2 W1 W0, and the binary representation of the virtual register index is R4 R3 R2 R1 R0, the translation for non-GLOBAL registers would be as follows.

```
      W2  W1  W0
  +       R4  R3  R2  R1  R0
     P7 P6 P5 P4 P3 P2 P1 P0
```

In the example mapping shown in FIG. 6, the GLOBAL registers are those registers whose virtual register index is between 0 and 7 inclusive. Thus, if R4 and R3 are zero, the physical address 62 is simply the register index.

Since the registers are designed to be the fastest memory that the processor accesses, it is desirable to minimize the number of times a virtual to physical register address 62 calculation must be performed. The designer must decide which type of address to use in the annex structure. Referring to FIG. 7, if the physical address 62 is used, then a virtual-to-physical address translation 70 must occur prior to the results of an instruction being entered into the annex 71. Furthermore, in order to search the annex 71 for operands of an instruction, each operand's virtual address must be translated prior to the search. This presents a large overhead in both hardware and delay.

SUMMARY OF THE INVENTION

Since it is desirable that all instructions dispatched at the same time be written back to the destination registers at the same time, a shorter functional unit will be followed with several additional pipeline stages to equalize the latency. These additional stages are a completion unit register file, or an annex. It is necessary to be able to retrieve data from the annex for use by subsequent instructions. If virtual addresses are stored in the annex, no translation need occur, but the system must be able to locate aliases of the instruction operand address being searched for.

According to the present invention, a qualify bit is appended to each entry in the annex. Only when the qualify bit of an entry is set can that entry's address possibly match the instruction operand address. Annex entries addressed to the same window always qualify. Annex entries addressed to GLOBAL registers always qualify. Annex entries addressed to OUT registers only qualify if the instruction address is one of the IN registers of the next window. Annex entries addressed to IN registers only qualify if the instruction address is one of the OUT registers of the previous window.

According to the present invention, a pseudoaddress bit is appended to each annex entry to facilitate easy comparison against an instruction operand address. Virtual register addresses are represented by a window pointer and a register index. LOCAL registers have no aliases. The indexes of the GLOBAL registers are the same for all windows. For the other registers (the ins and outs), the indexes for the aliases differ by one bit, the most significant bit of the address. The pseudo-address bit allows the comparison of the indexes so that aliases will be detected even when the indexes are not exactly equal. The pseudo-address bit normally takes on the value of the most significant bit of the annex entry's index. However, if the instruction operand virtual register is an OUT register of a certain window, and the annex virtual register is an IN register within the next window, the pseudoaddress bit for that entry is set to one. If the instruction operand virtual register is an OUT register within the previous window, the pseudo-address bit for that entry is set to zero.

Comparison logic then compares the instruction operand index to the annex index with the most significant bit of the annex index replaced by the pseudo-address bit. Entries that match and that have asserted qualify bits address the same physical register.

BRIEF DESCRIPTION OF THE DRAWINGS

FIG. 12 is a logic diagram of the computation of an annex entry match signal for the register scheme of FIG. 6 according to the present invention.

DETAILED DESCRIPTION OF THE INVENTION

Figure 8:
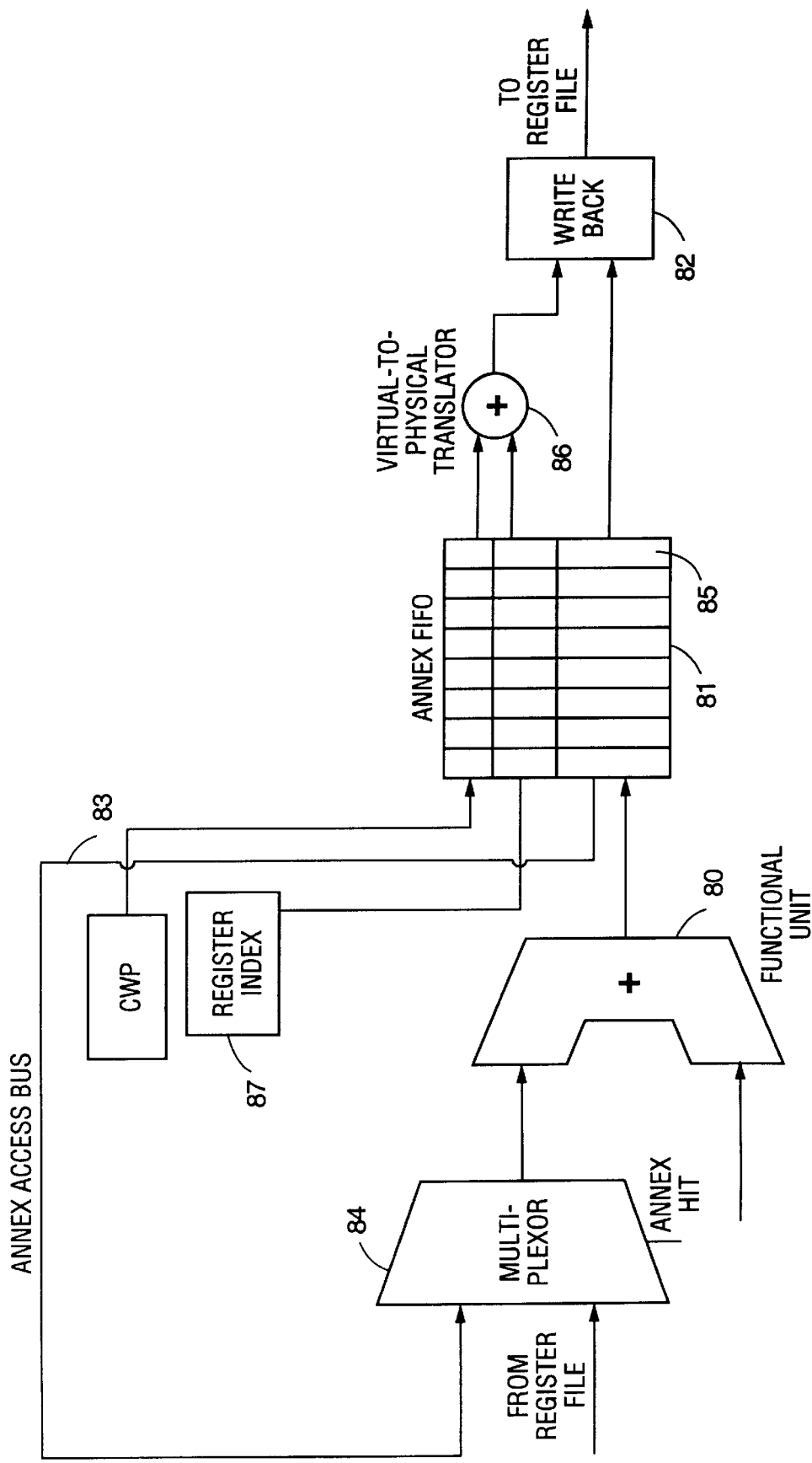
FIG. 8 is a simplified block diagram illustrating an architecture when the annex stores virtual addresses according to the present invention.

FIG. 8 is a simplified block diagram of the functional unit 80, annex 81, and write-back 82 pipeline of a processor according to the present invention. Instructions are executed by the functional unit 80. Those instructions normally require one or more operands. If one of the current instruction's operands is the result of a recently executed instruction, that result must be fetched from the annex 81 via the annex access bus 83. The multiplexor 84 chooses whether to use data from the register file or from the annex 81 depending upon whether there is an annex hit.

Results are clocked through the annex FIFO sequentially until they reach the last stage 85. Before being delivered to the write-back stage 82 where the results are finally written into the register file, a virtual to physical register address translation 86 occurs.

According to the present invention, the annex 81 can store virtual addresses of the results that it holds. (Prior art methods stored the physical address in the annex.) If the annex 81 maintains the virtual addresses in its entries, then the virtual to physical register address translation 86 only needs to occur at the end of the annex pipeline 81 as depicted in FIG. 8. In order to search for an instruction's operands, no translation 86 needs to occur. This does not mean to imply, however, that the translation 86 must occur at the end of the annex pipeline. In order to minimize the timing constraints on the write-back stage 82, the translation 86 may be performed at any time prior to the write-back stage 82. In exchange for providing extra hardware in the annex 81 in which to store the physical address, the translation may occur at any stage or stages in the annex 81, so long as the physical address is available when it is time to write back the results.

The structure of the annex has been described and depicted as a shift register. However, it could also be implemented as a random access memory file with a pair of circulating pointers. The write-back stage would read results out of the memory location pointed to by an "end of pipeline" pointer, which would be decremented after each result was read out of the annex. The functional unit would write its results into the memory location pointed to by a "front of pipeline" pointer, which would be decremented after each result was written into the annex. For the sake of clarity, the discussion refers to the shift register implementation, but the claims are intended to cover other equivalent implementations such as the random access memory implementation as well.

If each physical address has only one virtual address which maps to it, then the search for operands in the annex 81 is a straightforward comparison. Such a comparison for all annex entries could be simultaneously accomplished using a content addressable memory.

However, the search for operands within the annex 81 is complicated somewhat when there are more than one virtual address for the same physical register address. For example, virtual register addresses A and B may both map to physical register 6. If a previous instruction had written to virtual address A, that result may still be in the annex 81. When a subsequent instruction using B as an operand is resident at a functional unit ready to be executed, then the result in the annex 81 destined for physical register 6 should be retrieved, since A and B are aliases for each other.

Figure 6:
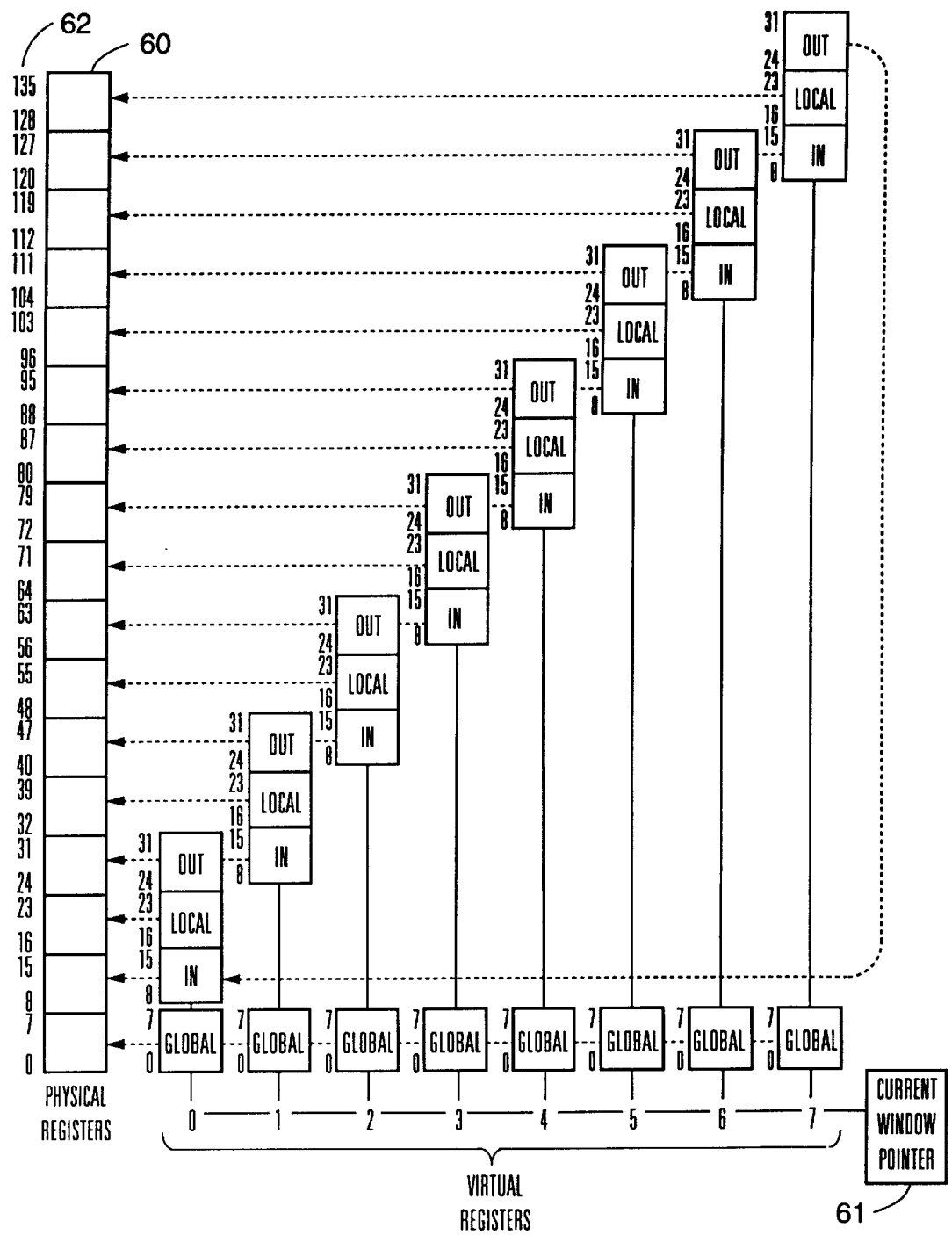
FIG. 6 shows the mapping between virtual registers and physical registers for a typical overlapping register scheme having eight windows and 32 virtual registers per window.
Figure 7:
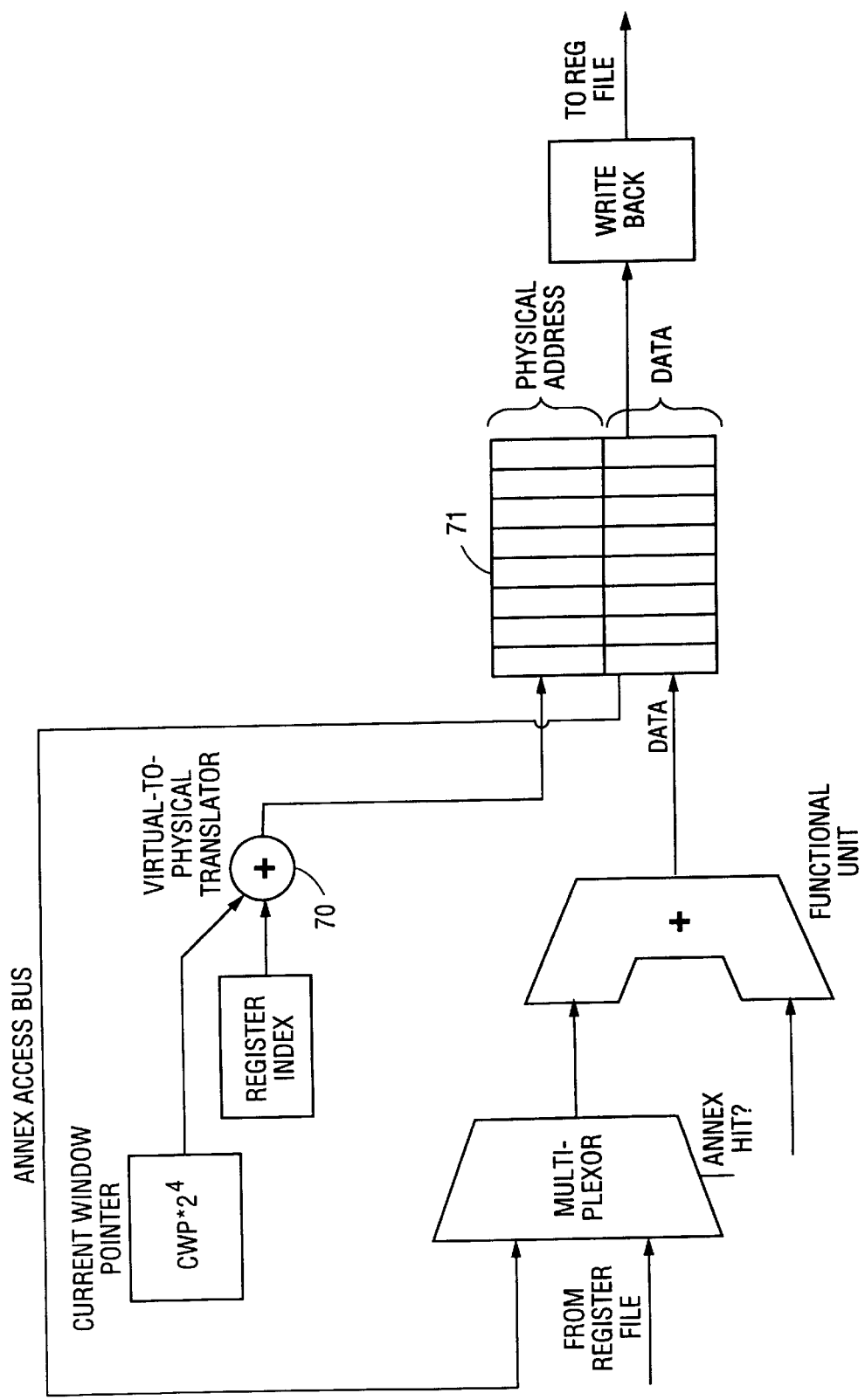
FIG. 7 is a simplified block diagram illustrating an architecture when the annex stores physical addresses.

In a register window configuration as depicted in FIG. 6, there are 8 windows, and 32 registers within each window. Thus, the current window pointer 61 requires three bits to represent (W2, W1, and W0), and the register index requires five bits to represent (R4, R3, R2, R1, and R0). The concatenation of the three bit current window pointer 61 and the five bit register index is an eight bit virtual address. The eight GLOBAL registers in each of the eight windows all map to the same eight physical registers. Therefore, for each of the physical registers indexed 0 through 7, there are eight virtual aliases—one for each window. In contrast, each of the eight LOCAL registers for each window have only one virtual register which maps to it. Each of the IN registers for a window is an alias for one of the OUT registers of the previous window.

In order to search for the contents of a given register, there must be a way to recognize which virtual addresses are aliases of the virtual address being searched for. According to the present invention, a qualify bit is appended to each entry in the annex 81. When an access to a virtual register is made, the virtual address of the requested register is compared to the virtual register addresses stored in the annex 81. The address of the operand of the instruction being searched for will be referred to as the "instruction" address, while the address in an annex entry will be referred to as an "annex" address. For the sake of clarity, an "I" will precede the instruction address bits, while an "A" will precede the annex address bits. Therefore, for the system of FIG. 6, the virtual address bits are IW2 IW1 IW0 IR4 IR3 IR2 IR1 IR0 for the virtual instruction address and AW2 AW1 AW0 AR4 AR3 AR2 AR1 AR0 for the virtual annex address.

In calculating the values of the qualify bits according to the present invention, annex entries containing results addressed to the same window as the current window of the operand always qualify. If the current window pointer of the operand and the current window pointer stored for any annex entry match, then the qualify bit for that annex entry is set. Thus, the qualify bit is set if IW2 IW1 IW0=AW2 AW1 AW0. This is the only way that results in the annex addressed to LOCAL registers can qualify, since LOCAL registers have no aliases. Furthermore, IN registers, OUT registers, and GLOBAL registers within the same window will also qualify using this rule.

Annex entries containing results destined for GLOBAL registers always qualify. Since the register index for GLOBAL registers of any window are between 0 and 7 inclusive, or 00000 and 00111 in binary, the two most significant bits (AR4 and AR3) of the five bit virtual register index are always zero. Thus, the qualify bit of any given annex entry is set whenever AR4 and AR3 are both zero.

Figure 1:
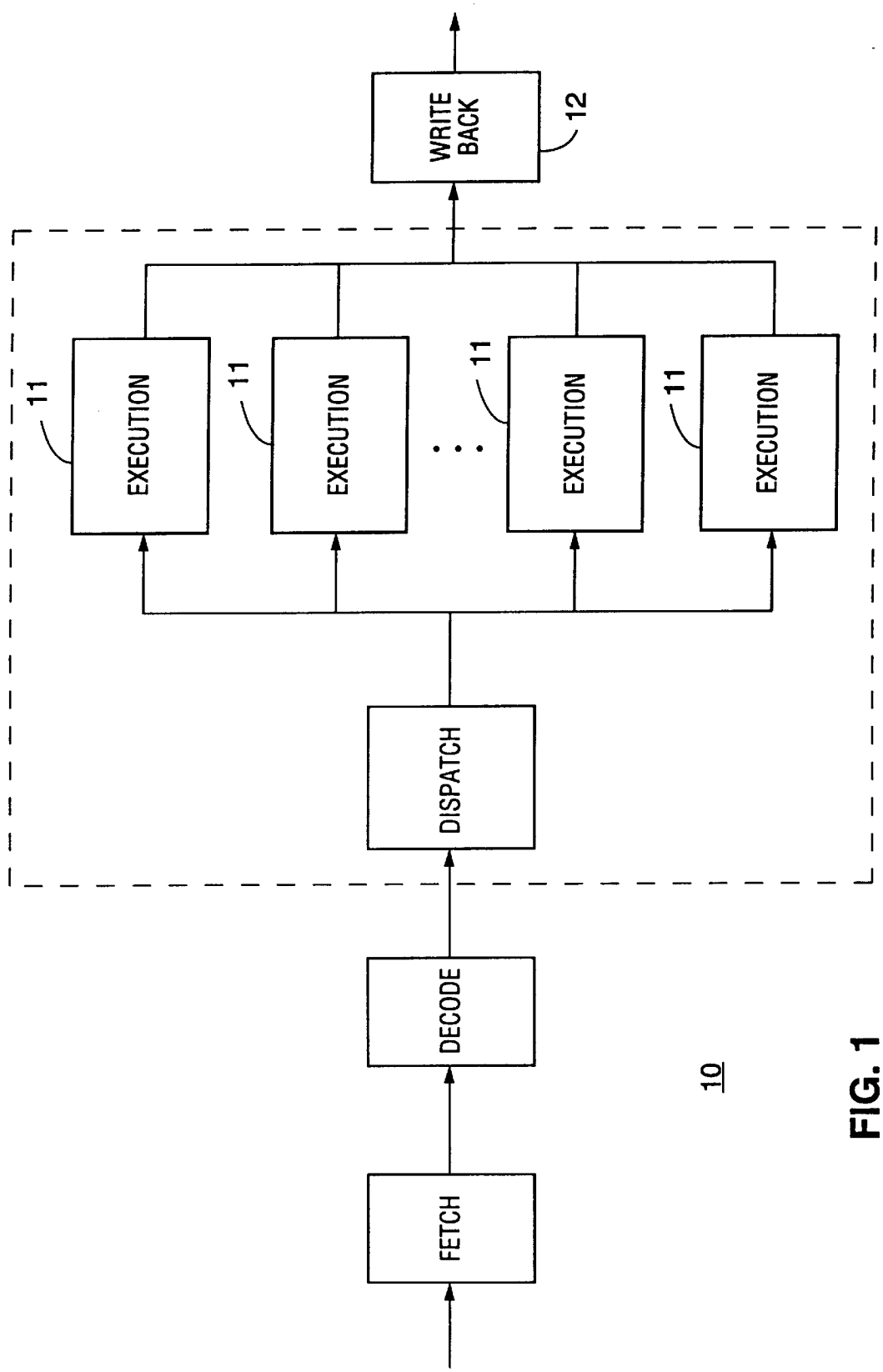
FIG. 1 is a simplified block diagram illustrating a superscalar processor architecture.
Figure 2:
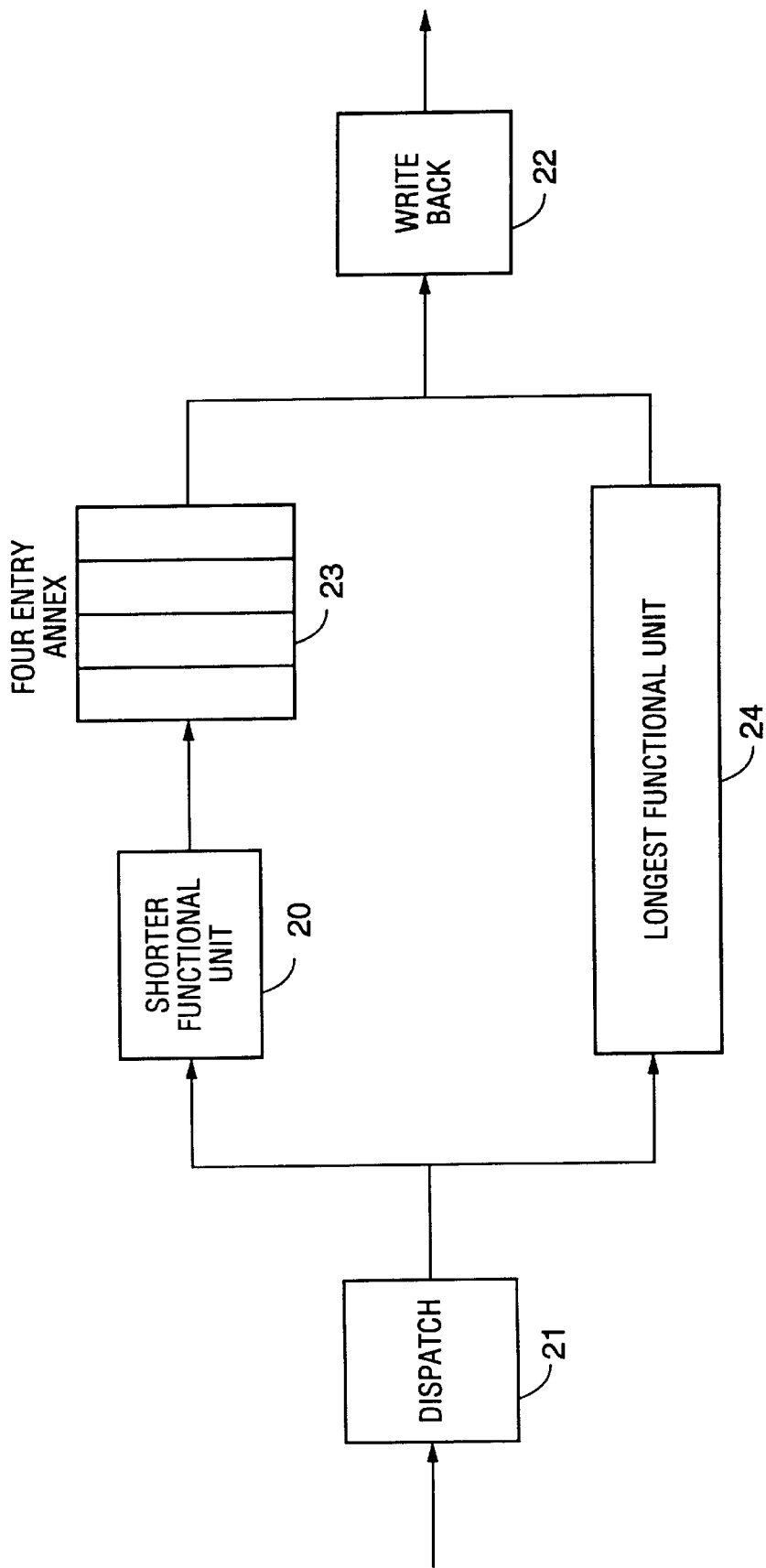
FIG. 2 is a simplified block diagram of a two-scalar execution stage in which one stage has an annex.
Figure 3:
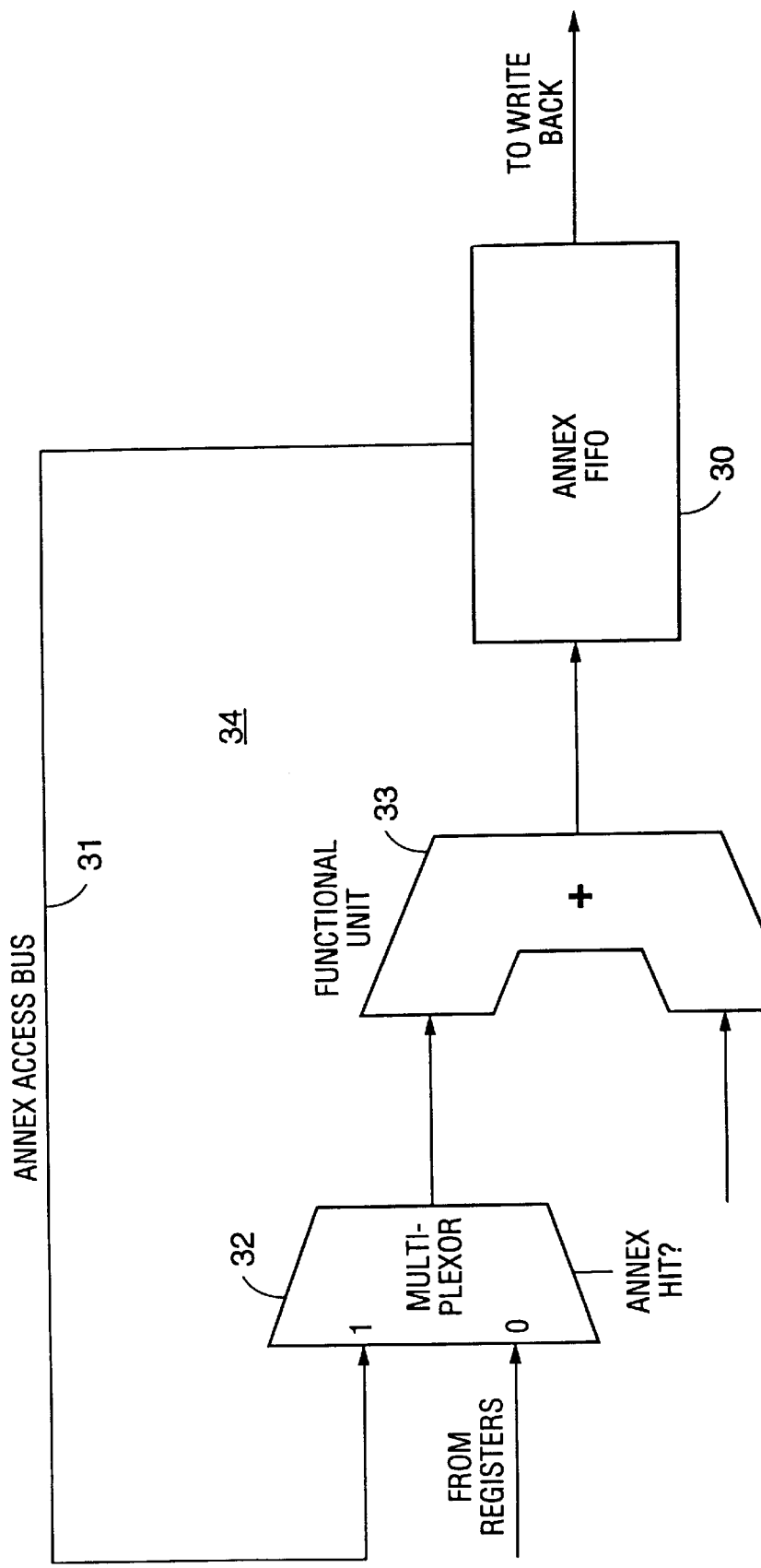
FIG. 3 is a simplified block diagram illustrating a way to provide access to the entries of the annex.
Figure 4:
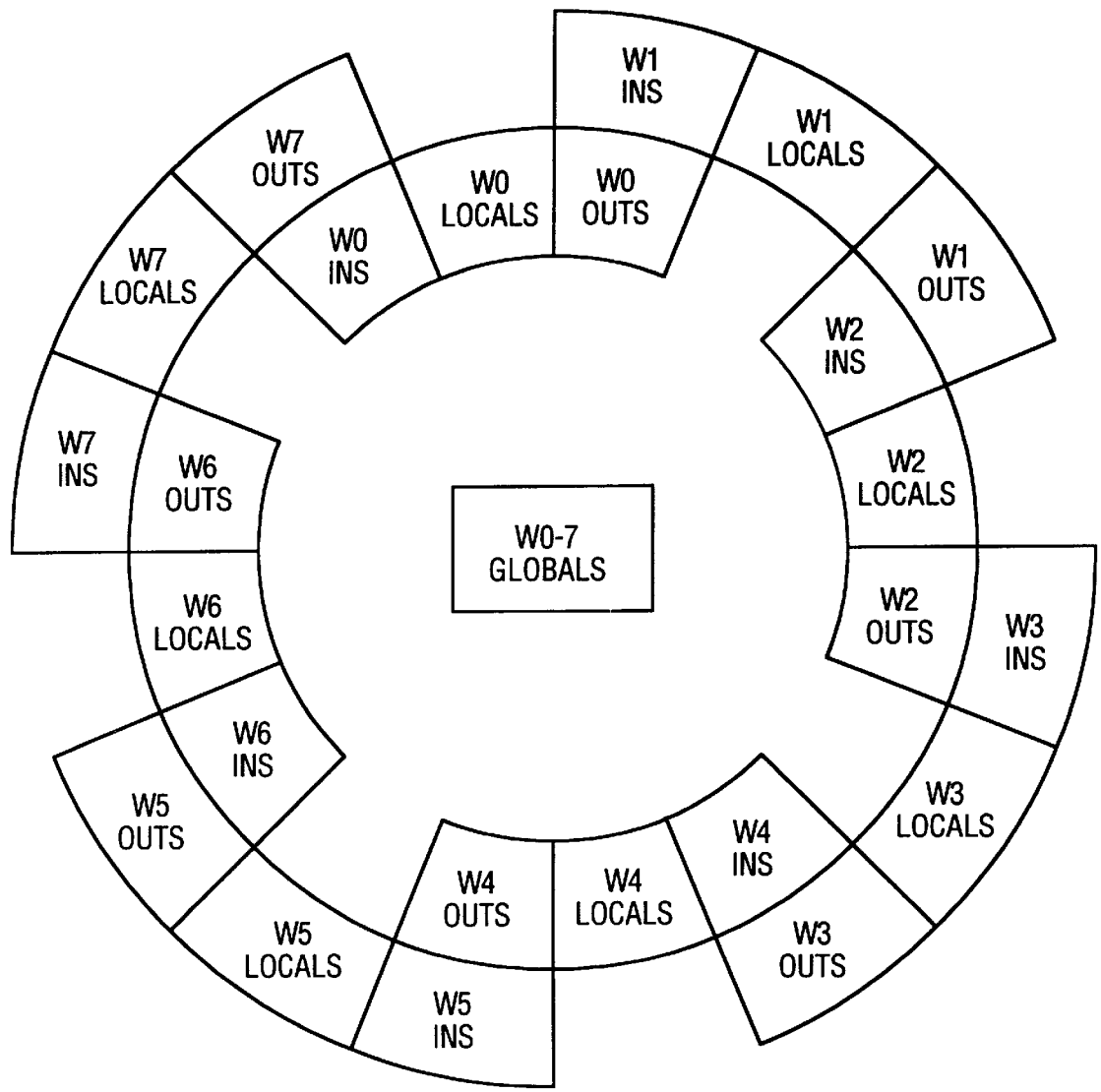
FIG. 4 depicts an eight-window overlapping register scheme.
Figure 5:
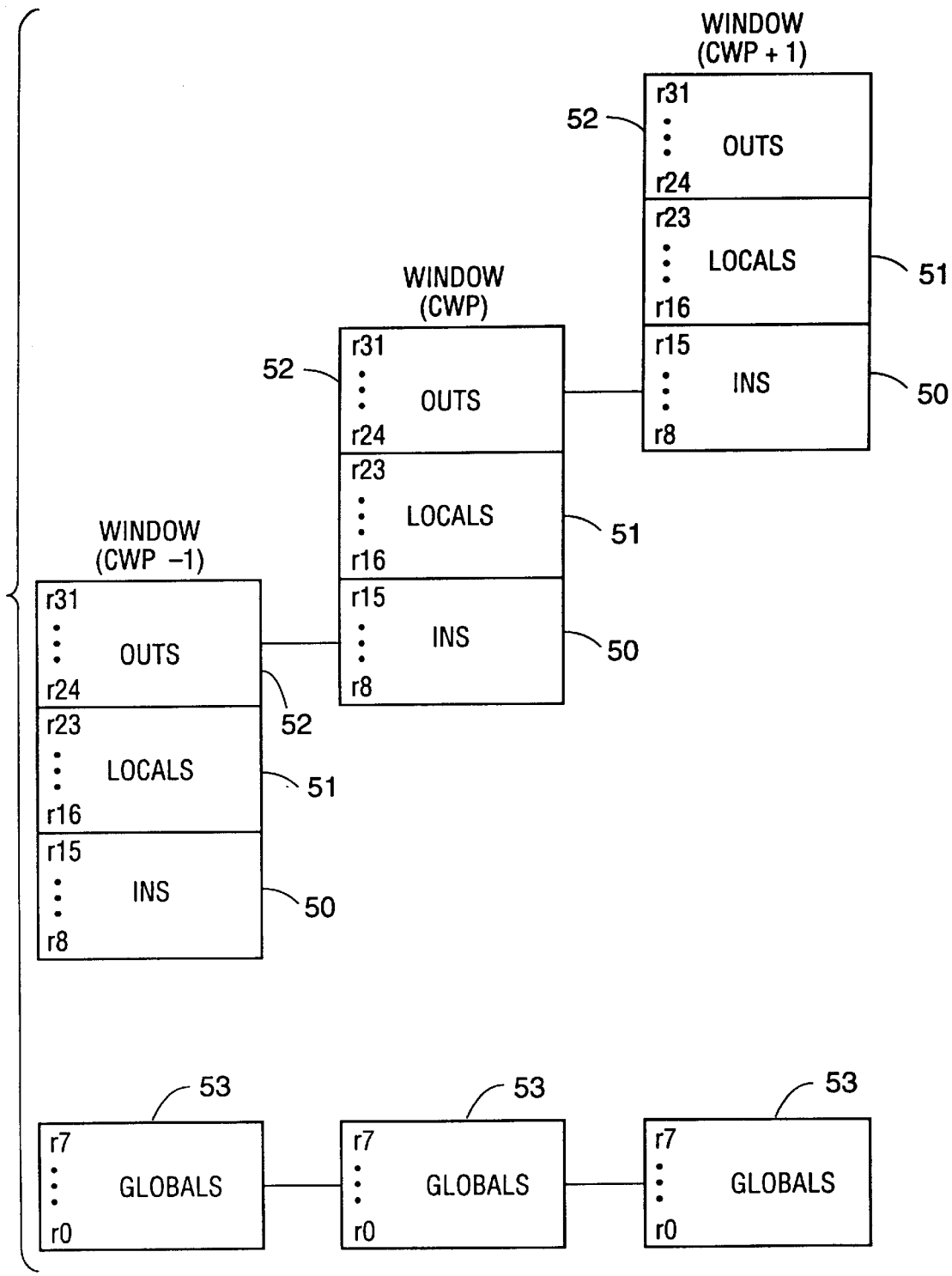
FIG. 5 depicts an overlapping register scheme showing the way the current window relates to the previous window and next window.

Annex entries containing results addressed to non-GLOBAL registers in a different window than the instruction window only qualify if the annex address is in a group of addresses which has an alias of the instruction address. Annex addresses destined for OUT registers of the annex window qualify only if the instruction address is one of the IN registers of the next window. As shown in FIGS. 5 and 6, the OUT registers are those with virtual address indexes between 24 and 31 inclusive, or 11000 through 11111 in binary. Thus, for OUT registers, the most significant virtual address indexes R4 and R3 are both one. Also, the IN registers are those with virtual address indexes between 8 and 15 inclusive, or 01000 and 01111 in binary. For IN registers, the most significant virtual address indexes R4 is zero while R3 is one. Thus, only when the annex current window pointer is one greater than the instruction current window pointer [(AW2 AW1 AW0+1) modulo 8=IW2 IW1 IW0)], AR4 and AR3 are one, IR4 is zero, and IR3 is one, do annex entries qualify by this rule.

Similarly, annex addresses destined for IN registers of the annex window qualify only if the instruction address is one of the OUT registers of the previous window. Thus, only when the annex current window pointer is one less than the instruction current window pointer [(AW2 AW1 AW0−1) modulo 8=IW2 IW1 IW0)], IR4 and IR3 are one, AR4 is zero, and AR3 is one, do annex entries qualify by this rule.

Figure 9:
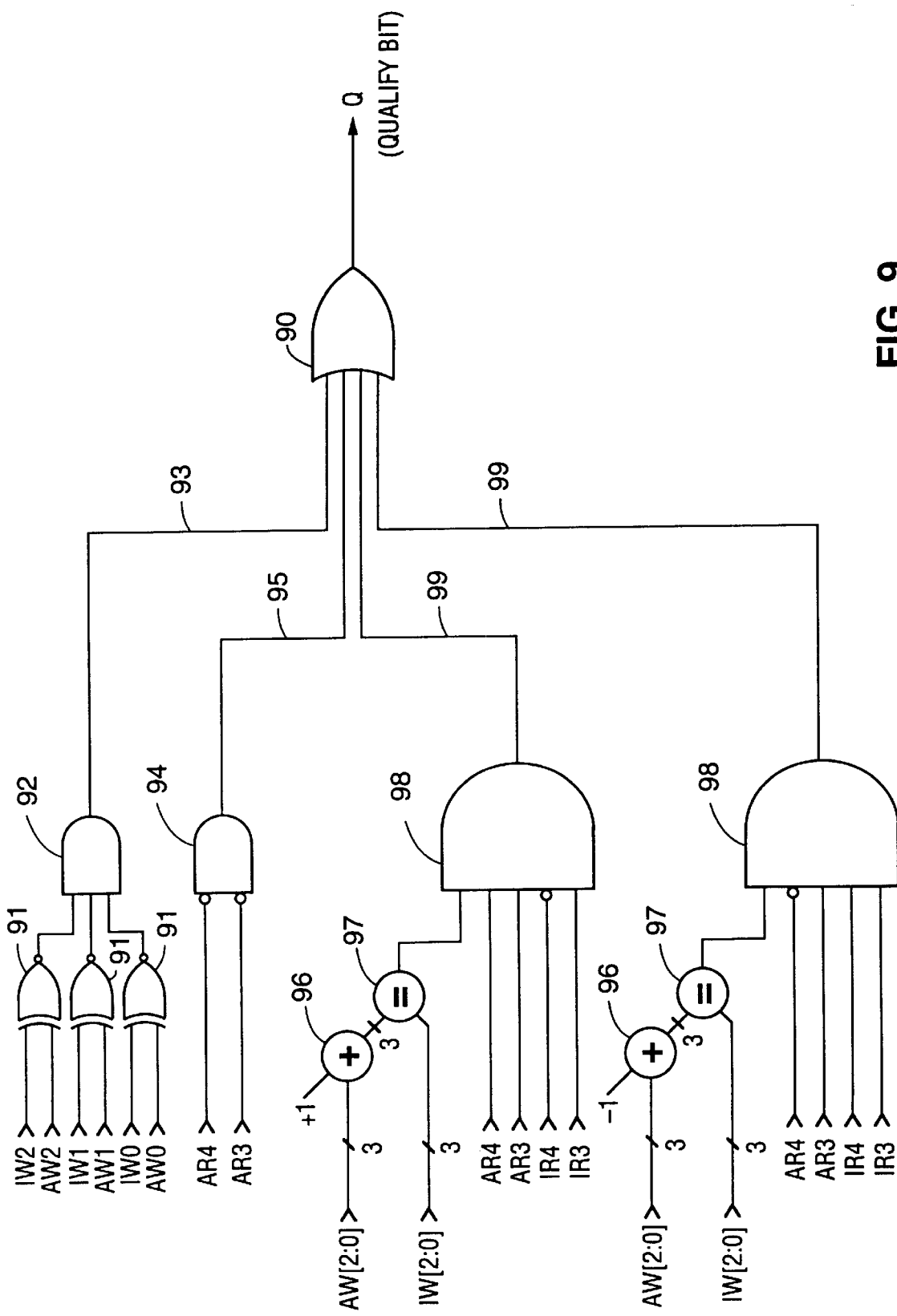
FIG. 9 is a logic diagram of the computation of the qualify bit of an annex entry for the register scheme of FIG. 6 according to the present invention.

In the annex, combinational logic exists on a per-entry basis to calculate the qualify bit for use each time a new instruction address is searched for. In order to remove the qualify bit computations from the critical path, the computations are performed the cycle before the qualify bits will be used. The result of the computation is stored on a per entry basis and is immediately available during the next clock cycle. Since many instructions have more than one operand, it is desirable to search for all the operand registers in the annex. If these multiple searches are performed in parallel, then there may be a separate qualify bit for each operand search port. Essentially, the qualify bit calculation logic for the register mapping shown in FIG. 6 is just the logical OR of the midterms or conditions described above. FIG. 9 shows this unoptimized logic. Of course, for a given combinational logic function, the true logical implementation may be optimized logically either to reduce the number of gates, to reduce the latency, or to accommodate the particular type of technology used. Furthermore, if the register mapping is different from that shown in FIG. 6, then the logic equations themselves will be different that described above. However, the correct logic equations for the qualify bit in any given virtual register scheme which supports register aliases can be derived in any manner similar to that described above.

In FIG. 9, exclusive NOR gates 91 compare each bit of the instruction window pointer to the corresponding bit of the annex window pointer. An exclusive NOR gate performs the logical function of an equivalence test; only when both inputs are the same is the output asserted. AND gate 92 only produces an asserted output when all the corresponding instruction and annex window pointers are the same. Thus signal 93 is only asserted when the instruction and annex window pointer for that entry are the same.

NOR gate 94 only produces an asserted output when both AR4 and AR3 are zero. Thus, signal 95 is only asserted when the annex address is to a GLOBAL register.

ADDERS 96 calculate the next and previous window from the instruction window, and one of EQUALITY TESTS 97 produces an asserted output only when annex window pointer is one less or one greater than the instruction window pointer. The top AND gate 98 produces an asserted output only when the instruction window pointer is one more than the annex window pointer and the instruction index is an IN register while the annex index is an OUT register. The bottom AND gate 98 produces an asserted output only when the instruction window pointer is one less than the annex window pointer and the instruction index is an OUT register while the annex index is an IN register. Thus, one of signals 99 is asserted only when the annex entry is an OUT or IN address which could be an alias for the IN or OUT instruction address. OR gate 90 produces the qualify bit output which is the logical OR of the midterms carried on signals 93, 95, and 99.

Once the qualify bits have been calculated, the actual determination of which entries address the same physical address as the instruction address can be performed. Those annex entries which have asserted qualify bits are the only entries which might contain results which are destined for the same physical register as the physical register mapped to by the virtual operand address being searched for. In order to find matches, the instruction register index (IR4 IR3 IR2 IR1 IR0) is bussed to all the annex entries.

If the instruction index being search for is a GLOBAL or LOCAL address index, then the instruction index can be directly compared to the annex index (AR4 AR3 AR2 AR1 AR0) for each entry. For the GLOBAL virtual registers, this is a result of the fact that all the aliases for the GLOBAL registers have the same index. The only differences among the aliases of the GLOBAL registers are in the window pointer. For the LOCAL virtual registers, there are no aliases, thus a match is found only when both the register indexes and the window pointers are the same. Since the qualify bit computation encodes the fact that the window pointers match, all that must be compared are the indexes for GLOBAL and LOCAL registers.

However, the IN and OUT virtual registers present a complication. As described above, each IN or OUT virtual register address has one alias. That alias has a different register index. Each IN virtual register is the alias of one OUT virtual register. IN registers have indexes in the range 8 to 15, inclusive, or 01000 to 01111 in binary. However, OUT register have indexes in the range 24 to 31, inclusive, or 11000 to 11111 in binary. The virtual OUT register address represented by (CWP) 11 R2 R1 R0 is the alias of the virtual IN register address represented by (CWP+1 modulo 8) 0 1 R2 R1 R0. Unfortunately, the R4 bits of the two aliases are opposite. If a direct comparison of the instruction index and the annex index is performed, the aliases of IN or OUT registers will not be found because the R4 bits are opposite.

According to the present invention, in order to solve the problem of finding the aliases of the IN and OUT virtual register addresses, another bit per annex entry is introduced. This "pseudo-address" bit (PA) is used to allow comparison of the indexes so that aliases will be detected even when the indexes are not exactly equal. The pseudo-address bit normally takes on the value of AR4. However, if the instruction virtual register is an OUT register within a window, and the annex virtual register is an IN register within the next window, the pseudo-address bit for that entry is set to one, so that PA=IR4=1. Similarly, if the instruction virtual register is an IN register within a window, and the annex virtual register is an OUT register within the previous window, the pseudo-address bit for that entry is set to zero, so that PA=IR4=0.

Figure 10:
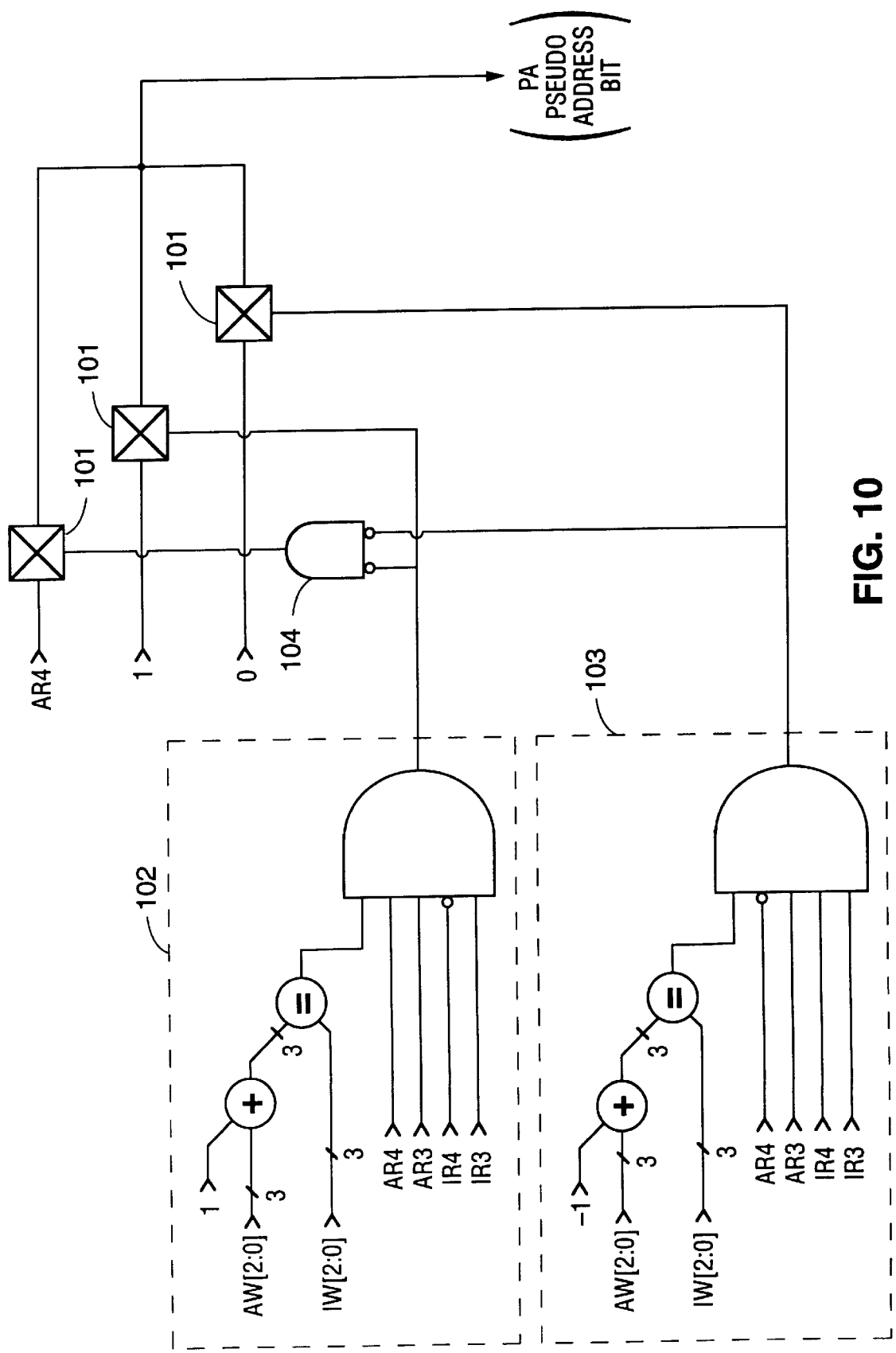
FIG. 10 is a logic diagram of the computation of the pseudo-address bit of an annex entry for the register scheme of FIG. 6 according to the present invention.

The logic shown in FIG. 10 is an example of one way to perform the computation of a pseudo-address bit for the register mapping scheme of FIG. 6. In FIG. 10, one and only one of the pass gates 101 is enabled at any given time. The pass gates 101 select the appropriate value for the pseudo-address bit. The enabling logic 102 and 103 for the two pass gates that are connected to 1 and 0 are the same logic used to generate last two midterms of the qualify bit computation. NOR gate 104 enables AR4 to be written into the pseudo-address bit whenever neither of the enabling logic 102 and 103 produces asserted output.

The comparison logic then compares the instruction index to a comparison index, which is the pseudo-address bit appended to the four least significant bits of the annex index. Thus, the pseudo-address bit PA replaces AR4 in the comparison. For any annex entry having an asserted qualify bit and in which IR4 IR3 IR2 IR1 IR0=PA AR3 AR2 AR1 AR0, that annex entry is addressed to the same physical register as the functional unit operand being searched for.

Figure 11:
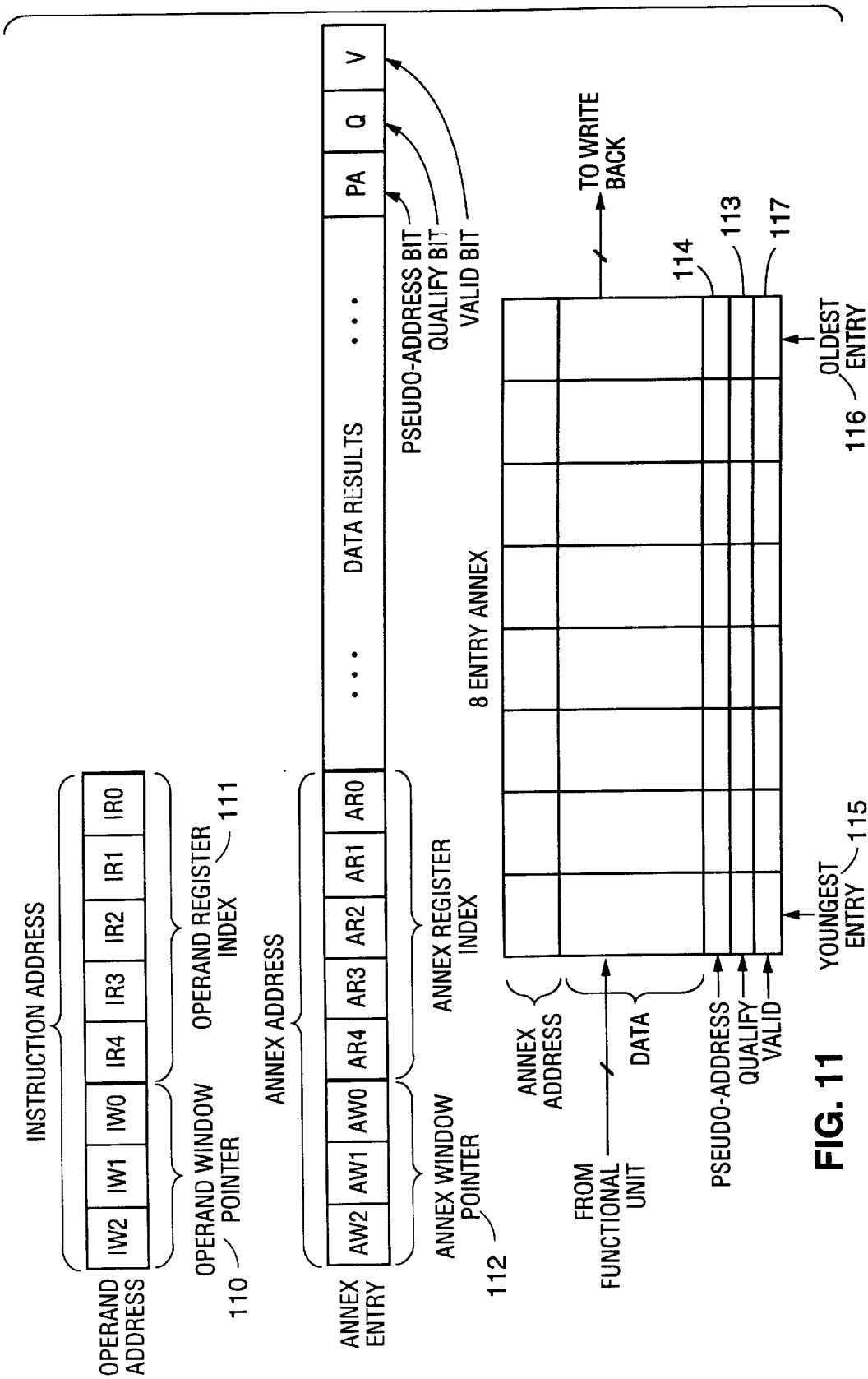
FIG. 11 shows the representation of the instruction operand address, the organization of data in an annex entry, and an eight entry annex for the register scheme of FIG. 6 according to the present invention.

FIG. 11 shows the way operands addresses are organized, the way information is organized in the annex, and an eight entry annex FIFO. The instruction address is represented by the current window pointer 110 appended to the operand register index 111. Typically, the current window pointer 110 will be stored in a register 87 (in FIG. 8). The register indexes will be referred to within instructions. For instance, an instruction like add rA, rB, rC would have the add instruction code and the register indexes for rA, rD, and rC. The current window pointer 110 is maintained separately. However, for purposes of searching the annex for matching virtual addresses, both the current window pointer 110 and the register index 111 are used. The annex entry contains the window pointer 112 from the clock cycle during which the functional unit 80 (in FIG. 8) produced the data results for that entry. The qualify bit 113, pseudo-address bit 114, and valid bit 117 are also maintained per annex entry. Newly produced results enter the annex on the left side of FIG. 11 into the youngest entry position 115. The annex itself is a pipeline which shifts entries along until the oldest entry position 116 is reached. The oldest entry is delivered to the write back stage 82 (in FIG. 8) during every cycle. The write back stage actually writes to the physical registers.

FIG. 12 illustrates logic that could be used to implement the qualify bit and pseudo-address bit scheme described above to produce an annex entry match signal 124. When the instruction index 121 is compared to the annex index 125, the most significant bit 126 of the annex index is replaced by the pseudo-address bit 127. If the comparator 122 detects equality, it produces an asserted output. The valid bit 129 indicates whether or not the annex entry contains meaningful information. If the qualify bit 128, the valid bit 129, and the output of the comparator 122 are all asserted, AND gate 123 produces an annex entry match signal 124. When the annex entry match signal 124 is asserted, the results in that annex entry are addressed to the same physical register as the instruction operand virtual address.

The above descriptions have centered around the register mapping scheme shown in FIG. 6. However, this discussion has been directed toward that scheme by way of example, not by limitation. There are many alternative register mapping schemes. For example, more or fewer windows could be provided, or more or fewer registers per window could be provided. GLOBAL registers or LOCAL registers or both could be eliminated entirely or in part. The relative positions of INs and OUTs could be altered. There are many other obvious variations which will not be enumerated for sake of brevity, but which are intended to be covered by the claims.

Similarly, the logic implementations shown are presented by way of example. The exact implementation of the logic shown, or even the exact logical relationships themselves, are merely examples of how the logic could be implemented for the register mapping shown in FIG. 6. For a variety of reasons such as the technology or optimization, there are a multitude of obvious variations to the implementation logic disclosed herein. If the register mapping scheme is different from that shown in FIG. 6, the logic diagrams must also change. All extensions and modifications are intended to be within the scope and spirit of the present invention.

What is claimed is:

1. A method of generating a qualify bit for a completion unit register file entry for use in comparing a completion unit register file virtual address in the completion unit register file entry to an instruction operand virtual address, wherein each virtual address maps to a group of physical addresses and a single physical address within that group, the method comprising the steps of:

asserting the qualify bit if the completion unit register file virtual address and the instruction operand virtual address both map to one group of physical addresses; and deasserting the qualify bit if the completion unit register file virtual address and the instruction operand virtual address each map to a different group of physical addresses, wherein the completion unit register file includes a plurality of registers configured to store and maintain successive completion unit register file entries in chronological order.

2. A method as in claim 1 wherein each virtual address includes a window pointer and a register index.

3. A method as in claim 2 wherein different virtual addresses which map to the same physical address either have identical register indexes or have register indexes which differ by only one predetermined bit.

4. A method as in claim 2 wherein the window pointer in each virtual address indicates one of a plurality of virtual register windows.

5. A method as in claim 4 wherein every virtual register window has global register addresses which map to identical physical registers for every register window.

6. A method as in claim 5 wherein every virtual register window has local register addresses which map to different physical registers for every register window.

7. A method as in claim 6 wherein every virtual register window has in register addresses and out register addresses, such that the in register addresses map to identical physical register addresses as the out register addresses of another virtual register window, and the out register addresses map to identical physical register addresses as the in register addresses of another virtual register window.

8. A method of generating a pseudo-address bit for a completion unit register file entry for use in comparing a completion unit register file virtual address in the completion unit register file entry and an instruction operand virtual address, wherein each virtual address includes a window pointer and a register index, in a virtual register scheme which supports virtual register windows which overlap such that two virtual addresses may map to the same physical address and yet have two register indexes which differ by only one predetermined bit, the method comprising the steps of:

assigning the value of the predetermined bit of the instruction operand register index to the pseudo-address bit when the completion unit register file virtual address and the instruction operand virtual address map to the same physical address; and assigning the value of the predetermined bit of the completion unit register file register index to the pseudo-address bit when the completion unit register file virtual address and the instruction operand virtual address map to different physical addresses, wherein the completion unit register file includes a plurality of registers configured to store and maintain successive completion unit register file entries in chronological order.

9. A method of generating a match signal which is asserted when a completion unit register file virtual address, including a completion unit register file window pointer and a completion unit register file register index, in the completion unit register file entry, and an instruction operand virtual address, including an instruction operand window pointer and an instruction operand register index, map to one physical address, wherein the completion unit register file entry includes a qualify bit and a pseudo-address bit, the method comprising the steps of:

forming a completion unit register file comparison index by replacing a predetermined bit of the completion unit register file register index with the pseudo-address bit;

comparing the instruction operand register index to the completion unit register file comparison index to generate an equality signal; and asserting the match signal if and only if the qualify bit and the equality signal are both asserted, wherein the completion unit register file includes a plurality of registers configured to store and maintain successive completion unit register file entries in chronological order.

10. An apparatus for generating a qualify bit for a completion unit register file entry for use in comparing a completion unit register file virtual address in the completion unit register file entry to an instruction operand virtual address, wherein each virtual address maps to a group of physical addresses and a single physical address within that group, the apparatus comprising:

an assertion circuit for asserting the qualify bit if the completion unit register file virtual address and the instruction operand virtual address both map to one group of physical addresses; and a deassertion circuit for deasserting the qualify bit if the completion unit register file virtual address and the instruction operand virtual address each map to a different group of physical addresses wherein the completion unit register file includes a plurality of registers configured to store and maintain successive completion unit register file entries in chronological order.

11. An apparatus as in claim 10 wherein each virtual address includes a window pointer and a register index.

12. An apparatus as in claim 11 wherein different virtual addresses which map to the same physical address either have identical register indexes or have register indexes which differ by only one predetermined bit.

13. An apparatus as in claim 11 wherein the window pointer in each virtual address indicates one of a plurality of virtual register windows.

14. An apparatus as in claim 13 wherein every virtual register window has global register addresses which map to identical physical registers for every register window.

15. An apparatus as in claim 14 wherein every virtual register window has local register addresses which map to different physical registers for every register window.

16. An apparatus as in claim 15 wherein every virtual register window has in register addresses and out register addresses, such that the in register addresses map to identical physical register addresses as the out register addresses of another virtual register window, and the out register addresses map to identical physical register addresses as the in register addresses of another virtual register window.

17. An apparatus for generating a pseudo-address bit for a completion unit register file entry for use in comparing a completion unit register file virtual address in the completion unit register file entry and an instruction operand virtual address, wherein each virtual address includes a window pointer and a register index, in a virtual register scheme which supports virtual register windows which overlap such that two virtual addresses may map to the same physical address and yet have two register indexes which differ by only one predetermined bit, the apparatus comprising:

a first assignment circuit for assigning the value of the predetermined bit of the instruction operand register index to the pseudo-address bit when the completion unit register file virtual address and the instruction operand virtual address map to the same physical address; and a second assignment circuit for assigning the value of the predetermined bit of the completion unit register file register index to the pseudo-address bit when the completion unit register file virtual address and the instruction operand virtual address map to different physical addresses wherein the completion unit register file includes a plurality of registers configured to store and maintain successive completion unit register file entries in chronological order.

18. An apparatus for generating a match signal which is asserted when a completion unit register file virtual address, including a completion unit register file window pointer and a completion unit register file index, in the completion unit register file entry, and an instruction operand virtual address, including an instruction operand window pointer and an instruction operand register index, map to one physical address, wherein the completion unit register file entry includes a qualify bit and a pseudo-address bit, the apparatus comprising:

a formation circuit for forming a completion unit register file comparison index by replacing a predetermined bit of the completion unit register file register index with the pseudo-address bit;

a compare circuit for comparing the instruction operand register index to the completion unit register file comparison index to generate an equality signal; and an assertion circuit for asserting the match signal if and only if the qualify bit and the equality signal are both asserted wherein the completion unit register file includes a plurality of registers configured to store and maintain successive completion unit register file entries in chronological order.

19. A process of providing circuitry for generating a qualify bit for a completion unit register file entry for use in comparing a completion unit register file virtual address in the completion unit register file entry to an instruction operand virtual address, wherein each virtual address maps to a group of physical addresses and a single physical address within that group, the process comprising the steps of:

providing an assertion circuit for asserting the qualify bit if the completion unit register file virtual address and the instruction operand virtual address both map to one group of physical addresses; and providing a deassertion circuit for deasserting the qualify bit if the completion unit register file virtual address and the instruction operand virtual address each map to a different group of physical addresses wherein the completion unit register file includes a plurality of registers configured to store and maintain successive completion unit register file entries in chronological order.

* * * * *